(12) United States Patent
Merz

(10) Patent No.: US 7,736,791 B1
(45) Date of Patent: Jun. 15, 2010

(54) DIALYTIC POWER GENERATOR USING DIFFUSION GRADIENTS

(75) Inventor: Clifford R Merz, Safety Harbor, FL (US)

(73) Assignee: University of South Florida, Tampa, FL (US)

( * ) Notice: Subject to any disclaimer, the term of this patent is extended or adjusted under 35 U.S.C. 154(b) by 1058 days.

(21) Appl. No.: 10/904,658

(22) Filed: Nov. 22, 2004

Related U.S. Application Data

(60) Provisional application No. 60/481,687, filed on Nov. 21, 2003.

(51) Int. Cl.
*H01M 2/38* (2006.01)
*H01M 6/24* (2006.01)

(52) U.S. Cl. ..................... 429/51; 429/50; 429/101; 429/122

(58) Field of Classification Search ............ None
See application file for complete search history.

(56) References Cited

U.S. PATENT DOCUMENTS

| | | | | |
|---|---|---|---|---|
| 3,346,422 | A * | 10/1967 | Berger | 427/115 |
| 4,171,409 | A * | 10/1979 | Loeb | 429/17 |
| 4,311,771 | A * | 1/1982 | Walther | 429/51 |
| 4,340,475 | A * | 7/1982 | Kraus et al. | 210/232 |
| 4,512,886 | A * | 4/1985 | Hicks et al. | 210/170.05 |
| 5,961,796 | A * | 10/1999 | Hitchens et al. | 204/252 |
| 6,544,679 | B1 * | 4/2003 | Petillo et al. | 429/34 |

OTHER PUBLICATIONS

Mitsuo Abe et al. ed., New Developments in Ion Exchange Materials, Fundamentals, and Applications, Proceedings of the International Conference of Ion Exchange, 1991, Tokyo.
Robert N. O'Brien, Reverse Electrodialysis—an Unused Power Source?, Chemistry in Britain, Oct. 1986, pp. 927-929.
Haruhiko Ohya, Scale-Up of Dialytic Battery Using Ion-Exchange Membranes, 1991, pp. 436-439.
H. Ohya, Dialytic Battery Convertible Fee Energy of Mixing of Sea Water and River Water, Alternate Energy, 1983, pp. 451-456.

\* cited by examiner

*Primary Examiner*—Jonathan Crepeau
*Assistant Examiner*—Tony Chuo
(74) *Attorney, Agent, or Firm*—Molly L Sauter; Smith & Hopen, P.A.

(57) ABSTRACT

The invention describes a current generating cell device, which uses concentration gradients to create the electric flux. The cell is preferably defined by the use of a porous separator or bi-polar membrane to effect ion separation. In addition, an ion-exchange resin or other conductivity enhancement method may be present in one or both compartments to enhance the ion flow characteristics. In addition, the use of the ion-exchange resin or other conductivity enhancement method may also be used in combination with conventional two-membrane systems.

41 Claims, 4 Drawing Sheets

DIALYTIC POWER GENERATOR USING DIFFUSION GRADIENTS

CROSS REFERENCE TO RELATED APPLICATIONS

This application claims priority to U.S. Provisional Patent Application No. 60/481,687, "Dialytic Power Generator Using Salinity Gradients", filed, Nov. 21, 2003.

BACKGROUND OF INVENTION

It has long been known from thermodynamics and the literature that, in principle, useful energy can be made available when dilute and concentrated solutions are mixed. As known in the art, a naturally occurring, diffusion-driven, spontaneous transport of ions occurs throughout a solution matrix, thru barrier interfaces, or thru ion-selective membranes from the side containing the salts of higher concentration to the compartments containing the more dilute solution to effect the equalization of concentration of the ionic species. Since this ion movement consists, preferentially, of either cations or anions, it leads to a charge separation, otherwise known as a potential difference across the membrane. Eventually, the membrane gradually opposes further charge transfer buildup and thus equilibrium is established at a specific value of the potential difference.

In previous disclosures, pathways are separated by a cation/anion membrane stack, such as those found in Electrodialysis (ED) units where direct current provides the motive force for ion migration from the low concentration side to the higher concentration side. Because concentration gradient driven systems force ion migration from the high concentration side to the low, these systems are sometimes referred to as Reverse Electrodialysis or Dialytic systems (not to be confused with Electrodialysis Reversal (EDR) systems in which the polarity of the ED electrodes are periodically reversed to aid in the breaking up and flushing out of scales, slimes and other deposits from the membrane stack).

One such dialytic system as disclosed in the art describes a series of 40 pairs of cation and anion-exchange membranes that form a stack to generate electricity in a dialytic flow battery structure. Here, two saline solutions of differing concentrations were allowed to flow along the sides of the membranes to affect the potential difference. Because of the use of a two-membrane system, the resultant flow structure becomes complicated, especially when a plurality of cells are used in tandem. An additional system known in the art, utilizes river and seawater thus establishing the difference in salinity and ion concentrations. No mention is made of the number of cells needed to produce electricity, and it is again noted that separate anion and cation membranes are used. In another system known in the art, a river and seawater dialytic battery is disclosed. Again the compartments are stacked and range from 10 to 40 pairs of anion/cation membranes. Again, a dual membrane system is employed is this system as disclosed.

It is evident from the prior art that there is a need for a simplified electric current generating system that does not suffer from the complexities of the dual membrane systems known in the art and which is also capable of generating useful electric current which can be used to power systems both integral to the battery or fuel cell or isolated therefrom.

SUMMARY OF INVENTION

The present invention is directed to a novel fuel cell or battery, which uses the concentration differential of ion solutions, including, but not limited to salt solutions in various aqueous media to effect ion mobility and electrical current generation. A method and apparatus is disclosed for the generation of power from the concentration gradient present between a first concentrated ionic solution and a second dilute ionic solution passing thru adjacent pathways, separated by a porous substrate. Diffusive flows of cations, such as sodium, across the cation selective membrane, and anions, such as chloride, across the anion selective membrane establish a flux of electric charge between two electrodes, one positioned within the first concentrated ionic solution and a second positioned within the dilute solution.

In a particular embodiment, the present invention provides an apparatus for the generation of electric current, the apparatus including a reservoir having a first compartment to contain an ion solution of a first concentration and a second compartment to contain an ion solution of a second concentration, the second ion concentration higher than the first ion concentration, a porous separator positioned to separate the first compartment from the second compartment, a fluid inlet in fluid communication with the first compartment of the reservoir, a fluid outlet in fluid communication with the first compartment of the reservoir, a first electrode positioned within the first compartment and a second electrode positioned within the second compartment.

In a specific embodiment, the ion solution of the first concentration is sodium chloride and the ion solution of the second concentration is sodium chloride. However, other ionic solutions are within the scope of the present invention. The concentration differential between the two concentrations is such that a sufficient concentration gradient exists. In an exemplary embodiment, the concentration of the concentrated, or second solution, is higher than that of the dilute, or first solution, by a ratio of 10:1.

In a preferred embodiment, the porous separator is a bipolar membrane. Bipolar membranes are known in the art to be employed in industrial applications. However, the use of a bipolar membrane within a concentration gradient cell as in accordance with the present invention is not anticipated or obvious in view of the prior art.

The fluid inlet in fluid communication with the first compartment is a source of ion-containing fluid of a first concentration. Accordingly, the flow of ion-containing fluid is replenished within the first concentration through the fluid inlet and discharged through the fluid outlet. Additionally, it is within the scope of the invention to include a fluid inlet in fluid communication with the second compartment of the reservoir and a fluid outlet in fluid communication with the second compartment of the reservoir, such that the ionic solution of the second compartment is additionally replenished and discharged.

The fluid inlet may be in fluid communication with a naturally occurring source of fluid, such as a stream or ocean and as such the flow of the naturally occurring source of fluid may be sufficient to be a fluid impelling means. Alternately, a pump may be used to supply the source of ionic fluid through the fluid inlet to the compartment. It is within the scope of the invention to utilize a low volume pump, such as a peristaltic pump, or a high volume pump, such as a diaphragm pump, or other pump means known in the art to supply fluid to the inlet.

The electrodes positioned within the compartments and effective in the conduction of electric current may be fabricated of silver/silver chloride, however other materials appropriate to conduct electric current as known in the art are within the scope of the present invention.

To further enhance the ion exchange affinity of the ionic fluid within the compartments, either or both compartments may additionally include an ion-exchange resin or other conductivity enhancement methods known in the art.

In addition to a single diffusion cell, the present invention further encompasses the combination of a plurality of diffusion cell reservoirs. The plurality of diffusion cell reservoirs may be connected in series and/or in parallel, utilizing the electrodes, to form a plurality of diffusion reservoirs in tandem capable of supplying an increased electric current or voltage as required by the particular application.

In a particular embodiment, the reservoir is substantially annular. Accordingly, the first compartment of the reservoir is substantially annular and the second compartment is substantially annular, the second compartment positioned such that it is bounded by the first compartment, the first compartment separated from the second compartment by the porous separator.

The current generated as a result of the diffusion gradient utilizing a bipolar membrane and replenished ionic solution may additionally be used to supply the power necessary to split the water molecules of the ionic solution into hydrogen and hydroxide ions. As such, the apparatus of the present invention is effective in supplying an internally generated electric field sufficient for the electrodialysis of the water of the solution. In an additional embodiment, the electric field generated by the apparatus of the present invention is further enhanced with an external supply to provide additional current necessary for the electrolysis of the water in the ionic solution.

Accordingly, the present invention provides a method of generating electric current, the method including the steps of, providing an apparatus comprising a reservoir having a first compartment to contain an ion solution of a first concentration and a second compartment to contain an ion solution of a second concentration, the second ion concentration higher than the first ion concentration, providing a porous separator positioned to separate the first compartment from the second compartment, providing a first electrode positioned within the first compartment, providing a second electrode positioned within the second compartment, providing a fluid inlet in fluid communication with the first compartment of the reservoir, providing a fluid outlet in fluid communication with the first compartment of the reservoir, admitting the ion solution of a first concentration to the first compartment through the fluid inlet and discharging the ion solution from the first compartment through the fluid outlet to establish a replenishing flow of fluid through the first compartment and generating an electric current between the first electrode and the second electrode.

In an additional embodiment, the method further includes providing a fluid inlet in fluid communication with the second compartment and a fluid outlet in fluid communication with the second compartment to establish a replenishing flow of fluid through the second compartment.

In yet another embodiment, the method of the present invention includes the step of applying the current generated between the electrodes in the fluid in the first compartment and in the second compartment and dissociating the hydrogen ions and the hydroxide ions from the water of the fluid. Within this embodiment, the current generated from the electrodes of the reservoir may be further enhanced with an external current source to supply the current necessary for the effective dissociation of the water ions.

As such, the apparatus of the present invention provides a novel dialytic power generator utilizing salinity gradients and a novel diffusion gradient fuel cell.

An advantage of the present invention is the simplification of the device through the effective use of a single bipolar membrane or other porous separator capable of ion transport.

An additional advantage is the ability of the diffusion gradient fuel cell of the present invention to provide an essentially continuous supply of electric current by replenishing and discharging the ionic solutions of the device.

Yet another advantage is the ability of the diffusion gradient fuel cell of the present invention to provide a supply of electric current that is effective for the dissociation of water molecules into hydrogen and hydroxide ions.

Additional advantages will become apparent from the discussion of the invention that follows.

BRIEF DESCRIPTION OF THE DRAWINGS

For a fuller understanding of the nature and objects of the invention, reference should be made to the following detailed description, taken in connection with the accompanying drawings, in which.

DETAILED DESCRIPTION OF THE INVENTION

Figure 1:
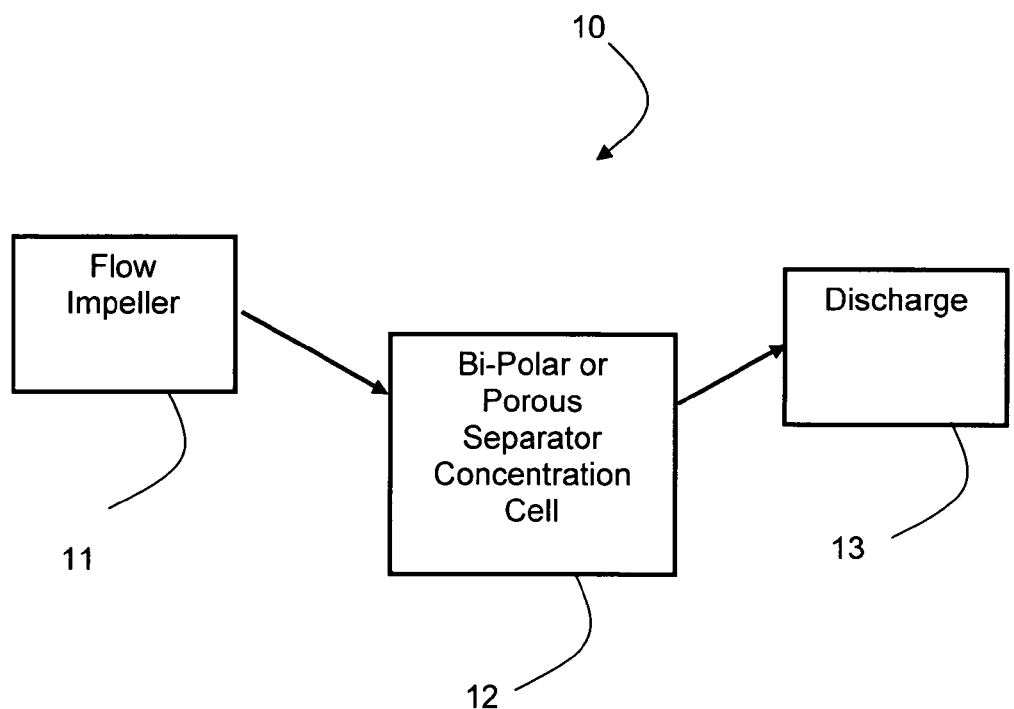
FIG. 1 is an illustrative view of a conductivity system in accordance with the present invention.

As previously discussed in the background of the invention, when the concentrations in the separate compartments of the dialytic power generator as known in the prior art become the same, an electric current is no longer generated and as such the dialytic power generator ceases to function as required. However, if operated as a fuel cell with its respective concentrations continually replenished in accordance with the present invention, equilibrium is established at a specific value of potential difference. This renewable instant energy has uses in a wide variety of applications and size scales depending upon the source of the supplied ionic solutions and the anticipated scale or end-use of the system. Some of these applications include, but are not limited to: Micro/small capacity direct power generation systems required for microelectromechanical systems (MEMS) and nanotechnology based devices, personal electronic and communication devices, and devices operated in the marine environment; Medium scale supplemental power generation, such as direct and energy recovery devices used in power generation and desalination plants; Large scale direct commercial power generation systems using naturally occurring salinity gradient differences such as those found where rivers discharge into the sea; and as a possible supplemental energy source for use in the generation of H+(protons) via membrane water dissociation (or splitting) technology.

The heart of any electro-membrane process is the ion exchange membrane. It usually consists of a polymer film with ionic groups attached to the polymer backbone. If these "fixed charges" contain a negatively (anionic) charged group fixed to the polymeric chain they are called Cation Exchange Membranes (CEM) because they are capable of exchanging positively charged cations. When the fixed charged group is positive (cationic), the membrane is called an Anion Exchange Membrane (AEM) because it is capable of exchanging negatively charged ions. In the case of cationic fixed charges the freely moveable counter-ions are anions. The membrane therefore exhibits ion exchange properties for counter-ions, which can permeate the membrane easily and excludes co-ions (of the same charge as the fixed charges) from the passage. The "permselectivity" between counter- and co-ions can reach values up to 99%. The permselectivity decreases with increasing ion concentration of the outside solution and decreasing capacity and degree of crosslinking of the ion exchange membrane. All electro-membrane processes make use of the above permselectivity of ion-exchange membranes.

The most important feature, which distinguishes ion-exchange from isotopic-exchange, is the electric coupling of the ionic fluxes. Conservation of electroneutrality requires stoichiometric exchange, i.e., the fluxes (in equivalents) of the exchanging counter ions must be equal in magnitude; otherwise a net transfer of electric charge would result. The regulating mechanism that enforces the equality of the fluxes is the electric field (diffusion potential) set up by the diffusion process produces an electric transference of both counter ions in the direction of diffusion of the slower counter ion; this electric transference is superimposed on the diffusion. The resulting net fluxes of the counter ions are equivalent to one another, while purely diffusional fluxes, as a rule, are not. Thus electroneutrality is preserved.

An electric field in an electrolyte solution produces transference of ions whose transport across an ion-exchange electro-membrane can be adequately described by the Nernst-Planck equation. In a solution of uniform composition under the assumption of electro-neutrality, the transference of an arbitrary ionic species in the direction of the current is proportional to the gradient of the electric potential, the concentration difference, and the electrochemical valance of the ionic species. It is irrelevant whether the field is generated by an external source (as in Electrodialysis—the most common electro-membrane process—used for desalination and concentrating of aqueous solutions) or generated internally via concentration gradient driven diffusion, since the individual ion has no means of knowing the origin of the electric field.

Electric current in an ion exchanger transfers predominantly via counter-ions by diffusion. The co-ion has relatively little effect on the kinetics and the rate of ion exchange. The Nernst-Planck equation holds reasonably well within the concentration range of about 10-4 to 10-1 N. Deviations at higher solution concentrations are caused by co-ion transference, and at lower concentrations by H+ or OH- (hydroxyl) ions (stemming from dissociation of H20) that compete with the electrolyte counter ion (i.e., the increasing concentration of the co-ion in the ion exchanger causes a decrease in the transport number of the counter-ion). Using the Nernst-Planck equation, the limiting value of the membrane potential (at room temperature) is 0.059 V per power of 10 activity ratios using a single ideal monopolar membrane, a 1,1-valance electrolyte, and reversible electrodes. Thus for a cell consisting of two membranes, the limiting value is nominally 0.120V. This cell membrane potential may be higher if the co-ion is more mobile than the counter-ion and if there is little Donnan exclusion of the co-ion.

A bipolar membrane consists of a monopolar CEM and monopolar AEM joined together with an intermediate transitional phase layer in between. Although made up of well-defined components, once combined the bipolar membrane acquires unique capabilities and additional uses. These include: 1) an apparent variation in membrane potential depending upon which side is in contact with the more concentrated solution, which is not the case in monopolar ion-exchange membranes; 2) its use in converting water soluble salts to their corresponding acids and bases via the process of water dissociation (or splitting). As is the case with standard AEM/CEMs, when an electrical field is established across a bipolar membrane the transfer of electrical charge will be carried preferentially by the ions present. However, under the effect of an electric field, charged species are also removed from the transitional phase layer between the two ion-exchange layers. When no ions are available within this region, further transport of electric charge can be accomplished only by H+ and OH- ions, which are available even in completely desalinated water. At a theoretical potential of 0.828 V, the water in the AEM dissociates (splits) into equivalent amounts of H+ and OH- ions. These ions ideally migrate from the intermediate layer with the H+ ions permeating through the CEM side and the OH- ions permeating the AEM side.

In bipolar membranes, there are 3 interfaces: (i) the interface between the concentrated saline solution and the anion-exchange membrane, (ii) the interface between the anion-exchange membrane and the cation-exchange membrane (intermediate transitional phase layer), and (iii) the interface between the cation-exchange membrane and the dilute saline solution. Among these three interfaces, the intermediate transitional phase layer is the most difficult to observe and it is not possible to measure the concentration experimentally. The transport properties of bipolar membranes are quite different from those of monopolar membranes. When an electric field is established across a bipolar membrane the anions and cations contained in the intermediate layer migrate through the AEM and CEM in the direction of the electric field. As a result of the current flow the intermediate layer becomes impoverished in salt and its resistance increases. Two Donnan potential differences develop between the intermediate layer and the outside and are opposite to the applied field. The intermediate layer in a bipolar membrane seems to act as an alteration barrier for the membrane potential according to the membrane facing direction. If we assume that the concentration of the immediate layer is lower than that of the external solutions, the ion-exchange layer which faces the concentrated solution will play the dominant role in determining the whole membrane potential, because the concentration ratio between the intermediate layer and the external concentrated solution is much higher than that between the intermediate phase and the external dilute solution.

It is well known that salts in solution can be converted unto their corresponding acids and bases by a process called electrodialytic water splitting across a bipolar membrane. In the presence of a potential field, water at the interface will dissociate (will cause water at the interface between to ionize). This water dissociation and its coupling with ion transport offers the possibility of using bipolar membranes in a great variety of practical applications.

The process of electrodialytic water splitting consists of a bipolar membrane arranged between two electrodes. If an electrical potential difference is established between the electrodes, charges species are removed from the interface between the two layers. When all the salt ions are removed from the solution between the two membranes, further transport of electrical charges can be accomplished only by the protons and hydroxide ions available from the ionization of water. Water so removed from the interface is replenished by water diffusing into the interface. When no ions are available within this region, further transport of electric charge can be accomplished only by H+ and OH- ions, which are available even in completely desalinated water. At a theoretical potential of 0.828 V, the water in the AEM dissociates (splits) into equivalent amounts of H+ and OH- ions. These ions ideally migrate from the intermediate layer with the H+ ions permeating through the CEM side and the OH- ions permeating the AEM side. However, H+ and OH- ions are not very effectively retained by a Donnan potential and co-ion leakage of H+ through the AEM as well as the OH-leakage through the CEM can occur. In addition, the H+ leakage through the AEM will increase with the water content of the membrane.

Referring now to FIG. 1, there is shown a system 10, which is comprised of a flow impeller 11 in fluid communication with a porous separator or bipolar concentration cell 12 and finally a discharge reservoir 13. The flow impeller 11 may be any suitable means as known to one of ordinary skill in the art and is selected for the particular environment the concentration cell 12 inhabits. That is, in the case of a self-contained application, such as buoy floating in weak or non-existent sea currents or a current generator inside a building or an instrument, a pump means or other suitable flow mechanism may be used. In the case of outdoor usages or incorporation into an industrial facility such as in the case of power generation or water desalination plants, the need for an actual pumping means may be obviated and natural or existing flow currents may be utilized to convey the salt solutions through the dialytic porous separator or bipolar membrane concentration cell 12.

The dialytic separator or bipolar concentration cell 12 is comprised of a pair of electrodes 21a and 21b. These electrodes may be formed from any known electrode materials, but in the preferred embodiment, reversible Ag/AgCl electrodes are used. Any orientation of the electrodes with respect to the membrane location may also be used, but consideration is given to making sure that optimization of the system efficiency is maintained.

Figure 2:
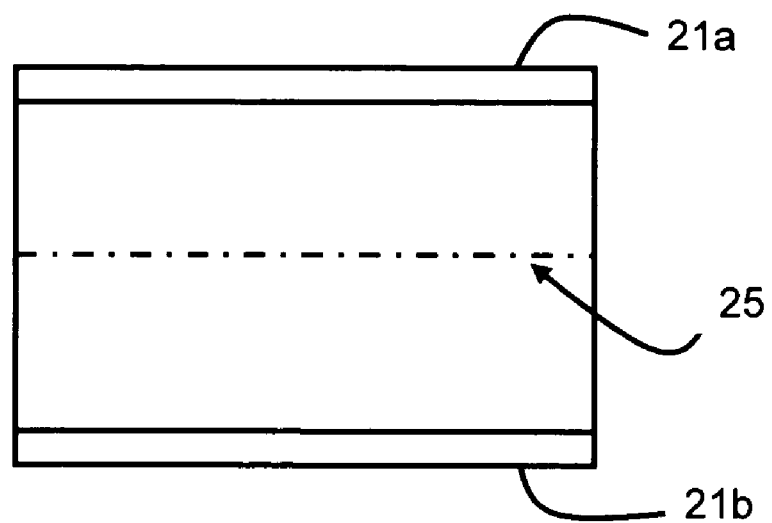
FIG. 2 is a schematic of a membrane-separated cell in accordance with the system of the present invention.

The membrane 25, as shown in FIG. 2, can be a porous separator such as a piece of fiberglass mesh or a bipolar membrane, or an ion-exchange ceramic membrane. A standard bipolar ion-exchange membrane consists of a cation-selective region, an anion-selective region and an interface therebetween. The cation-exchange region is negatively charged and highly permeable to counter-ions (cations) such as sodium (Na+) or potassium (K−) while impermeable to co-ions (anions) such as Cl−, HPO4-2, etc. Anion-exchange regions are positively charged and behave oppositely with the interface region being very thin in cross-section and of low resistance. Cations migrate through the cation-exchange membrane towards the negatively charged cathode. Anions migrate through the anion-membrane towards the positively charged anode.

Any bipolar membrane as known to those of skill in the art may be used, such as for example, BMI-9000, manufactured by Membranes International, Inc., is one type and is one form of a preferred embodiment. The design may be linear, annular in shape or of any other geometry as desired for specific application needs.

In addition to the bi-polar membrane, an ion exchange resin may also be incorporated into the system, either solely as a further embodiment or even in addition to a conventional bi-polar membrane system. This addition when used in conjunction with the porous separator or bi-polar membrane serves to enhance the performance characteristics of the system by modifying the conductivity of the output product water. Whereas, an ion-exchange membrane is in the form of a sheet, the addition of the ion-exchange resin adds a granular species into the system. While the phenomenon of ion exchange occurs as the permeation of ions in the case of the ion-exchange membrane, an adsorptive exchange of ions occurs with the addition of the ion-exchange resin. Because of this enhancement, an ion-exchange membrane does not require regeneration and, therefore, can be used for a longer period of time. With the periodic regeneration of the ion-exchange resin, adjustment of the cell potential difference as well as the salinity of the output product water can be achieved.

Figure 3:
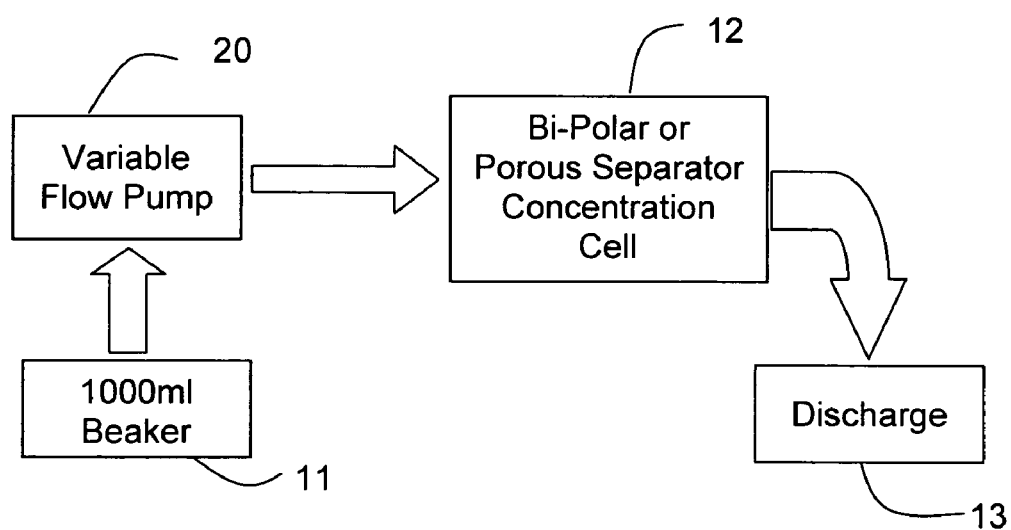
FIG. 3 is a block diagram illustration of the system in accordance with the present invention.

With reference to FIG. 3, a test apparatus was developed which consisted of a concentration test cell 12, a 1000 ml beaker of input dilute brine 11, a 1000 ml beaker for output brine 13 once it has circulated thru the dilute side of the cell, a peristaltic pump 20 for pumping the dilute brine thru the cell, and a computer running a data acquisition program. The test cell was cubic in shape with an overall dimension of 4"×4"×3". Cell construction consisted of two symmetrical sections, each consisting of an end plate, electrode, and test chamber, all bolted together. Each cell half was separated by a single separator (in this case porous fiberglass or a bi-polar membrane). The concentrated ionic solution section consisted of an entrained saturated slurry reservoir of Instant Ocean Sea Salt (IOSS) (chemically formulated to match actual seawater). The spacer was added followed by the dilute ionic solution section and the remainder of the cell. The dilute ionic solution was made from a 10 to 1 dilution of saturated IOSS. The dilute solution was pumped through the cell and collected in a 1000 ml beaker. Open circuit voltage (OCV) and 500-ohm loaded voltage measurements were made during the test as well as input/output salinity and temperature.

According to a first exemplary embodiment of the present invention, a single fiberglass mesh spacer was used as the separating mechanism. Test results indicated a nominal OCV value of 300 mVDC and a 500-ohm loaded voltage about 8 mVDC with the salinity of the output solution nominally 7 parts per thousand (ppt) higher than the input solution.

In accordance with a second exemplary embodiment of the present invention, a single bi-polar membrane was used as the separating mechanism. Test results indicated a nominal OCV value of 240 mVDC and a 500-ohm loaded voltage about 18 mVDC with the salinity of the output solution nominally 1 ppt higher than the input solution.

In accordance with a third exemplary embodiment of the present invention, a single bi-polar membrane again was used as the separating mechanism, but this time with the inclusion of MBD-15 ResinTech ion-exchange resin. Test results indicated that the addition of a small amount of ion exchange resin decreased the output salinity while minimally impacting the developed potential difference. Continued increase in the amount of resin reduced the developed potential difference and dropped the output measured salinity values to below that of the input.

It is additionally contemplated that with use of ion exchange resins, or other conductivity enhancing methods to facilitate ion mobility, that even a conventional two membrane or anion/cation membrane system may be used. With the addition of the ion exchange resin, the deleterious effects of the two-membrane system are obviated and the cell is capable of generating enough power to be effective.

Although many solutions may be used in the instant system, saline solutions of varying concentrations are preferred. In addition, any form of a bi-solution system may be used as long as the two solutions contain differing concentrations of ionic species so that ion motility occurs. The source of the solutions may be from any naturally occurring source as well as artificially formulated brine solutions.

Figure 4:
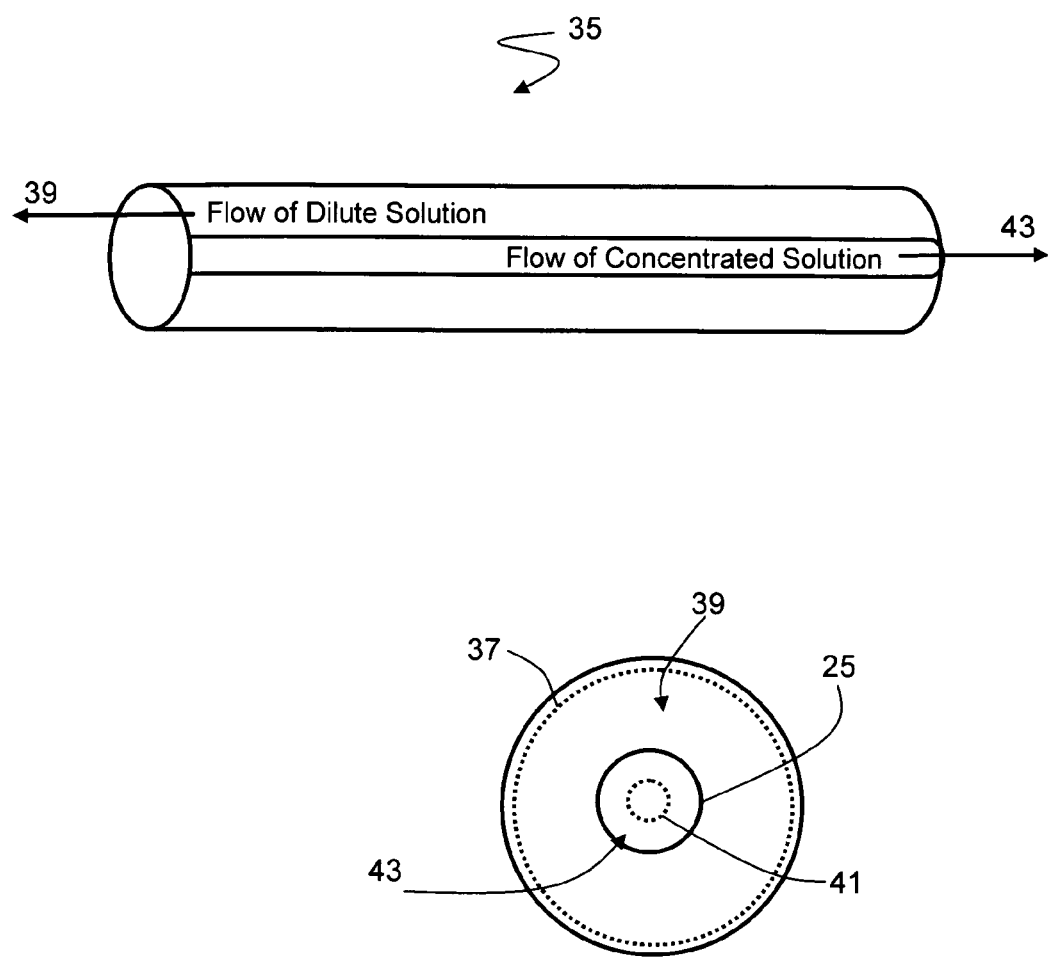
FIG. 4 is an exemplary embodiment of the system in accordance with the present invention.

With reference to FIG. 4, an additional embodiment shows a generally annularly shaped cell 35, as depicted in the drawings, but any other geometry as dictated by the eventual use of the cell is contemplated. The annular design is depicted as a preferred embodiment since it is highly desirable to use that shape for inclusion into a high flow rate power plant or desalination plant application. With reference to this embodiment, a first electrode 37 is positioned within the annular portion of the cell carrying the dilute solution 39, and a second electrode 41 is positioned within the annular portion of the cell carrying the concentration solution 43. Additionally, to prevent fouling of the system and associated electrodes, the dilute solution may be caused to flow through the interior annular portion 43 and the concentrated solution may be caused to flow through the exterior annular portion 39.

In the preferred embodiment, a single cell structure is represented, but in actual use, a plurality of cells may be aligned in series to generate the desired current to power any subject system. In addition, a variety of differing cells may also be aligned in the array type of structure, such as those previously mentioned, with ion exchange resin and even those with single polarity membranes. The use of these permits a wide variety of applications for the instant current generating system, with controls being devised by the types and numbers of cells in the generating array.

The instant energy can be used for stand-alone electrical generation or a supplemental energy recovery device such as those often found in desalination and power generation plants. Any ionic source may be used, as alluded to previously, and salt water as well as brackish or sources such as unpurified "fresh" water, which contain ionic species are also considered within the scope of the instant invention.

To minimize fouling effects of the membranes and electrodes, the polarity should be reversed periodically by alternating the concentrations of the solutions flowing through each of the solution sections. In the ion exchange resin embodiment, this requires that the resin be contained in both of the flow sections. In this embodiment also, periodic regeneration of the resin beads by use of standard cleaning solutions such as dilute acids or bases will be required, preferably at the onset of any solution reversal. In the case of the dilute source water conductivity enhancement embodiment, it is necessary to increase the number of ions or increase the mobility of the charge carriers present. This can be achieved by a number of sources including: the addition of chemical additives such as electrolytes, i.e., NaCl, HCl, or NaOH or by mechanical methods such as increasing the temperature of the source water. Other methods, both chemical and mechanical may also be used to effect this function; those being of knowledge to those of ordinary skill in the art.

The system can be used for power generation in a wide variety of applications and size scales with the concentrated and dilute ionic solutions supplied from several sources depending upon end use and scale of the system. Some of these include, but are not limited to: Micro scale/small capacity power generation systems such as those required for microelectromechanical systems (MEMS) devices and devices operated in the marine environment such as marine instrumentation and devices on marine buoys could obtain the concentrated ionic solution from an entrained slurry reservoir along with either a larger capacity dilute reservoir or external source; Medium scale (such as energy recovery devices for power generation and desalination plants) and Large scale power generation system concentrated brine sources include, but are not limited to, seawater, concentrated brine discharge from desalination plants, saturated solar ponds, highly saline bodies of water such as the Great Salt Lake or Red Sea, hyper saline ground water, naturally occurring salt springs, or water flowing through underground salt domes. Some sources of dilute brine sources include: brackish river water, ground or spring water, treated municipal water, or naturally occurring offshore springs.

Modification and variation can be made to the disclosed embodiment of the instant invention without departing from the scope of the invention as described. Those skilled in the art will appreciate that the applications of the present invention herein are varied, and that the invention is described in the preferred embodiment. Accordingly, additions and modifications can be made without departing from the principles of the invention. Particularly with respect to the claims it should be understood that changes may be made without departing from the essence of this invention. In this regard it is intended that such changes would still fall within the scope of the present invention. Therefore, this invention is not limited to the particular embodiments disclosed, but is intended to cover modifications within the spirit and scope of the present invention as defined in the appended claims.

It will be seen that the objects set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween. Now that the invention has been described,

What is claimed is:

1. An apparatus for the generation of electric current, the apparatus comprising:
    a reservoir having a first compartment to contain an ion solution of a first concentration and a second compartment to contain an ion solution of a second concentration, wherein the first concentration is different than the second concentration;
    a bipolar membrane positioned to separate the first compartment from the second compartment, the bipolar membrane comprising a monopolar cation exchange membrane and a monopolar anion exchange membrane joined together with an intermediate transitional phase layer in between, the bipolar membrane positioned such that the anion exchange membrane is adjacent to the first compartment and separated from the second compartment by the intermediate transitional phase layer and the cation exchange membrane and the cation exchange membrane is adjacent to the second compartment and separated from the first compartment by the intermediate transitional phase layer and the anion exchange membrane;
    a fluid inlet in fluid communication with the first compartment of the reservoir;
    a fluid outlet in fluid communication with the first compartment of the reservoir;
    a first electrode positioned within the first compartment; and
    a second electrode positioned within the second compartment.

2. The apparatus of claim 1, wherein the second ion concentration is higher than the first ion concentration.

3. The apparatus of claim 1, wherein the first ion concentration is higher than the second ion concentration.

4. The apparatus of claim 1, wherein the ion solution of the first concentration is sodium chloride.

5. The apparatus of claim 1, wherein the ion solution of the second concentration is sodium chloride.

6. The apparatus of claim 1, wherein the ion solution of the first concentration is from a naturally occurring source.

7. The apparatus of claim 1, wherein the ion solution of the second concentration is from a naturally occurring source.

8. The apparatus of claim 1, wherein the ion solution of the first concentration is an artificial brine or synthetic seawater.

9. The apparatus of claim 1, wherein the ion solution of the second concentration is an artificial brine or synthetic seawater.

10. The apparatus of claim 2, wherein the second concentration is higher than the first concentration by a ratio of 10:1.

11. The apparatus of claim 1, wherein the fluid inlet is in fluid communication with a source of ion-containing fluid of a first concentration.

12. The apparatus of claim 1, further comprising a fluid inlet in fluid communication with the second compartment of the reservoir and a fluid outlet in fluid communication with the second compartment of the reservoir.

13. The apparatus of claim 12, wherein the fluid inlet in fluid communication with the second compartment is in fluid communication with a source of ion-containing fluid of a second concentration.

14. The apparatus of claim 1, further comprising a pump in fluid communication with the fluid inlet of the first compartment.

15. The apparatus of claim 14, wherein the pump is a low volume pump.

16. The apparatus of claim 14, wherein the pump is a high volume pump.

17. The apparatus of claim 12, further comprising a pump in fluid communication with the fluid inlet of the second compartment.

18. The apparatus of claim 17, wherein the pump is a low volume pump.

19. The apparatus of claim 17, herein the pump is a high volume pump.

20. The apparatus of claim 1, wherein the fluid inlet to the first compartment is in fluid communication with a naturally occurring fluid impelling means.

21. The apparatus of claim 12, wherein the fluid inlet to the second compartment is in fluid communication with a naturally occurring fluid impelling means.

22. The apparatus of claim 1, wherein the first electrode comprises silver/silver chloride.

23. The apparatus of claim 1, wherein the second electrode comprises silver/silver chloride.

24. The apparatus of claim 1, further comprising ion-exchange resin positioned within the first compartment.

25. The apparatus of claim 1, further comprising ion-exchange resin positioned within the second compartment.

26. The apparatus of claim 1, wherein the first compartment is conductivity enhanced.

27. The apparatus of claim 1, wherein the second compartment is conductivity enhanced.

28. The apparatus of claim 1, further comprising a plurality of reservoirs having electrical connectivity between corresponding electrodes to form a tandem of diffusion reservoirs.

29. The apparatus of claim 1, wherein the reservoir is substantially annular, wherein the first compartment of the reservoir is substantially annular and the second compartment is substantially annular, the second compartment positioned such that it is bounded by the first compartment, the first compartment separated from the second compartment by the porous separator.

30. The apparatus of claim 1, wherein the bipolar membrane is effective in splitting the water of the solution into hydrogen and hydroxide ions.

31. The apparatus of claim 1, wherein the electric current generated by the apparatus is effective in supplying the electric current necessary for the electrodialysis of the water to provide hydrogen and hydroxide ions.

32. The apparatus of claim 1, wherein the electric current generated by the apparatus in combination with an external current source are effective in supplying the electric current necessary for the electrolysis of the water to provide hydrogen and hydroxide ions.

33. The apparatus of claim 1, wherein the electrodes are reversible electrodes.

34. A method of generating electric current, the method comprising the steps of:
providing an apparatus comprising a reservoir having a first compartment and a second compartment, the first compartment separated from the second compartment by a bipolar membrane, the bipolar membrane comprising a monopolar cation exchange membrane and a monopolar anion exchange membrane joined together with an intermediate transitional phase layer in between, the bipolar membrane positioned such that the anion exchange membrane is adjacent to the first compartment and separated from the second compartment by the intermediate transitional phase layer and the cation exchange membrane and the cation exchange membrane is adjacent to the second compartment and separated from the first compartment by the intermediate transitional phase layer and the anion exchange membrane, a first electrode positioned within the first compartment and a second electrode positioned within the second compartment;
introducing an ion solution of a first concentration into the first compartment and introducing an ion solution of a second concentration into the second compartment; and
generating an electric current between the first electrode and the second electrode.

35. The method of claim 34, wherein the second ion concentration is higher than the first ion concentration.

36. The method of claim 34, wherein the first ion concentration is higher than the second ion concentration.

37. The method of claim 34, further comprising introducing the ion solution of the first concentration into the first compartment through a fluid inlet in fluid communication with the first compartment and discharging the ion solution of the first concentration from the first compartment through a fluid outlet in fluid communication with the first compartment to establish a replenishing flow of fluid through the first compartment.

38. The method of claim 34, further comprising introducing the ion solution of a second concentration into the second compartment through a fluid inlet in fluid communication with the second compartment and discharging the ion solution of the second concentration from the second compartment through a fluid outlet in fluid communication with the second compartment to establish a replenishing flow of fluid through the second compartment.

39. The method of claim 34, further comprising:
applying the electric current generated between the electrodes in the fluid in the first compartment and in the second compartment; and
effecting electrodialysis of the water in the fluid to provide hydrogen and hydroxide ions.

40. The method of claim 34, further comprising:
applying the current generated between the electrodes in the fluid in the first compartment and in the second compartment; and
dissociating the hydrogen ions and the hydroxide ions from the water of the fluid.

41. The method of claim 34, further comprising an external current source working in combination with the current generated between the electrodes in the fluid in the first compartment and in the second compartment.

* * * * *